US008268404B2

United States Patent
Vandermeulen et al.

(10) Patent No.: US 8,268,404 B2
(45) Date of Patent: Sep. 18, 2012

(54) METHOD FOR APPLYING CORROSION PROTECTION COATINGS TO METAL SURFACES

(75) Inventors: Guido Vandermeulen, Ilvesheim (DE); Konrad Roschmann, Ludwigshafen-Edigheim (DE); Stephan Amthor, Ludwigshafen (DE); Marc Schroeder, Canton, MI (US); Alexsandro Berger, Mannheim (DE); Frank Klippel, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 320 days.

(21) Appl. No.: 12/665,554

(22) PCT Filed: Jun. 18, 2008

(86) PCT No.: PCT/EP2008/057653
§ 371 (c)(1),
(2), (4) Date: Dec. 18, 2009

(87) PCT Pub. No.: WO2008/155337
PCT Pub. Date: Dec. 24, 2008

(65) Prior Publication Data
US 2010/0255206 A1    Oct. 7, 2010

(30) Foreign Application Priority Data
Jun. 20, 2007   (EP) ..................................... 07110652

(51) Int. Cl.
*B05D 7/16* (2006.01)
(52) U.S. Cl. .................................. 427/388.1; 427/388.2
(58) Field of Classification Search .......................... None
See application file for complete search history.

(56) References Cited

U.S. PATENT DOCUMENTS

| 3,707,516 | A  |   | 12/1972 | Walus et al. |
| 4,025,672 | A  | * | 5/1977  | Hossenfelder ............. 427/388.4 |
| 5,707,941 | A  |   | 1/1998  | Haberle |
| 6,512,042 | B1 | * | 1/2003  | Fischer et al. ................ 524/558 |
| 6,517,905 | B2 | * | 2/2003  | White et al. ............... 427/385.5 |
| 6,756,072 | B2 | * | 6/2004  | Baumgart et al. ............ 427/195 |
| 2008/0233390 | A1 |   | 9/2008  | Gothlich et al. |
| 2008/0262145 | A1 |   | 10/2008 | Roschmann et al. |
| 2009/0123742 | A1 |   | 5/2009  | Vandermeulen et al. |
| 2011/0257302 | A1 |   | 10/2011 | Terrenoire et al. |

FOREIGN PATENT DOCUMENTS

| DE | 23 46 651      | 4/1974  |
| DE | 23 65 583      | 8/1975  |
| DE | 31 38 196      | 4/1983  |
| DE | 198 38 850     | 3/2000  |
| DE | 199 14 896     | 10/2000 |
| DE | 10 2008 000 269 | 10/2008 |
| EP | 0 047 380      | 3/1982  |
| EP | 0 157 133      | 10/1985 |
| EP | 0 311 906      | 4/1989  |
| EP | 1062282        | 12/2000 |
| JP | 55 66940       | 5/1980  |
| WO | 91 14722       | 10/1991 |
| WO | 99 46337       | 9/1999  |
| WO | 2004 101638    | 11/2004 |
| WO | 2005 005565    | 1/2005  |
| WO | 2008 017647    | 2/2008  |

OTHER PUBLICATIONS

English language abstracts of DE 2365583, Aug. 1975.*

* cited by examiner

*Primary Examiner* — Erma Cameron
(74) *Attorney, Agent, or Firm* — Oblon, Spivak, McClelland, Maier & Neustadt, L.L.P.

(57) ABSTRACT

The present invention relates to a method of applying atmospheric corrosion control coats to metallic surfaces, using copolymers comprising as monomeric building blocks monomers containing nitrile groups, monomers containing acidic groups, and vinylaromatic monomers. It relates, furthermore, to preparations for applying corrosion control coats.

17 Claims, No Drawings

METHOD FOR APPLYING CORROSION PROTECTION COATINGS TO METAL SURFACES

CROSS-REFERENCE TO RELATED APPLICATIONS

This application is a National Stage of PCT/EP08/057653 filed Jun. 18, 2008 and claims the benefit of EP 07110652.0 filed Jun. 20, 2007.

The present invention relates to a method of applying atmospheric corrosion control coats to metallic surfaces, using copolymers comprising as monomeric building blocks monomers containing nitrile groups, monomers containing acidic groups, and vinylaromatic monomers. It relates, furthermore, to preparations for applying corrosion control coats.

Metallic articles, components, structures or metal constructions made from typical metallic materials must as a general rule be protected from corrosion. An important position in corrosion control is occupied here by coatings which shield the metallic surface from the effects of corrosive media. Suitable corrosion control coating systems typically comprise one or more binders, anticorrosion pigments, organic corrosion inhibitors if desired, and further adjuvants and additives.

There are a variety of techniques which can be employed for applying corrosion control coats.

In the case of stationary metallic constructions such as buildings, bridges, power masts, oil tanks, pipelines, power stations or chemical plant, corrosion control coatings are usually applied in situ by brushing or spraying. The drying and curing of corrosion control coatings of this kind are accomplished under atmospheric conditions, in other words at ambient temperature and in the presence of air and usual atmospheric humidity. This type of corrosion control is also referred to as atmospheric corrosion control and frequently, depending on the nature of the corrosion exposure, as light, medium or heavy duty corrosion control.

DE 2365583 and DE 2346651 describe terpolymers consisting of up to 80% by weight of styrene or of styrene derivatives, at least 15% by weight of an ethylenically unsaturated nitrile monomer, and 5% to 35% by weight of an ethylenically unsaturated acid monomer, which may have been neutralized. Terpolymers of this kind are used as a constituent of a coating on cans for comestibles. For that purpose the coatings are baked at a temperature of 205° C. for 60 to 90 seconds.

There is no reference to the possibility of using such copolymers in atmospheric corrosion control.

U.S. Pat. No. 3,707,516 describes a coating composition comprising 5-50% by weight of film-forming constituents in an organic solvent. The film-forming constituents are composed of graft copolymers with 10-75% by weight of a polymeric backbone and 9-25% by weight of polymeric side chains. The polymeric backbone is composed of a copolymer of acrylonitrile, methyl methacrylate, styrene, and mixtures thereof, and less than 5% by weight of a copolymerized ethylenically unsaturated carboxylic acid. This coating composition may be used as a primer or varnish in order to protect metals from salt corrosion.

JP 55-066940 describes an aqueous coating composition which dries at room temperature for the coating of metal surfaces. The coatings exhibit enhanced chemical resistance, weathering stability, gloss, and adhesion. A polymer hydrosol is incorporated into a water-soluble resin. The polymer hydrosol is composed of particles with a size of about 0.1 μm, prepared by polymerizing an α,β-monoethylenically unsaturated carboxylic acid, an alkenyl-aromatic monomer, a (meth)acrylic ester, and 30% by weight of another α,β-monoethylenically unsaturated monomer, e.g., acrylonitrile.

The copolymers described in that specification are secondary dispersions. The ratio of these copolymers, referred to as an "additive", to the binder is between 95:5 and 55:45, and therefore constitutes the main constituent of the coating materials.

WO 91/14722 (Henkel, also EP 311906) describes aqueous polyacrylate dispersions or polyacrylate emulsions which are obtainable by copolymerization of a monomer which carries at least one carboxyl group and which has been neutralized prior to the copolymerization, and at least one other hydrophobic monomer. The mixture further comprises an emulsifier and at least one thickener. The composition is used as a coating material for the temporary protection of hard surfaces.

It was an object of the invention to provide an improved method of applying corrosion control coats for atmospheric corrosion control, and improved corrosion preventatives.

Found accordingly has been a method of applying corrosion control coats to metallic surfaces by treating the metallic surface with a preparation at least comprising a binder system (A), a component (B) selected from the group of finely divided fillers, pigments or dyes, and a polymeric corrosion preventative (C), wherein said polymeric corrosion preventative is a copolymer (C) synthesized from the following monomeric building blocks:

(C1) 5% to 60% by weight of at least one monoethylenically unsaturated monomer which contains at least one, preferably exactly one, nitrile group, (C2) 10% to 70% by weight of at least one monoethylenically unsaturated monomer which comprises at least one acid group, (C3) 20% to 80% by weight of at least one monoethylenically unsaturated aromatic hydrocarbon, and (C4) optionally 0% to 25% by weight of further, non-(C1 to C3) ethylenically unsaturated monomers, the amount being based in each case on the total amount of all monomeric structural units in the copolymer, and the corrosion preventative is subsequently dried and cured under atmospheric conditions.

This corrosion preventative is effective even in small amounts, and is readily miscible with the other components of the coating composition.

The difference in the challenges to the coatings and coating compositions from atmospheric corrosion control as compared with other corrosion control conditions is that in atmospheric corrosion control the coatings have a substantially higher coat thickness than in other applications, and are dried and cured at ambient temperatures, which means that drying and curing take a substantially longer time. Usually, and preferably, the corrosion control coating is also applied under atmospheric conditions. Throughout the entire time, the uncured, wet coatings are susceptible to, for example, water splash or effects of weathering, and so the requirements imposed on the coating materials are significantly different than those imposed on other corrosion control coating materials.

In the invention the method is a method of atmospheric corrosion control, in which a binder system which is curable under atmospheric conditions is used, and the layer is cured following application under atmospheric conditions.

In a further aspect the invention provides formulations for applying corrosion control coats which comprise the copolymers specified at the outset.

Surprisingly it has been found that the copolymers of the invention lead to improved corrosion control coats for atmospheric corrosion control. The copolymers impart effective corrosion control and effective adhesion to the surface and may also significantly improve the mechanical properties of the coatings. Through incorporation of additional hydroxyl and/or amino functionalities it is possible to enhance the attachment of the copolymers to the binder system. Moreover, the copolymer has a certain amphiphilicity, and is thus capable of stabilizing interfaces such as metal/coating, coating/environment, and hydrophobic/hydrophilic interfaces in the coating material.

Details of the invention now follow.

Copolymer (C)

The inventive copolymer (C) is synthesized from the monomers (C1), (C2), (C3) and, optionally, (C4), it of course also being possible to use in each case two or more different monomers (C1), (C2), (C3) and/or, optionally, (C4). Apart from (C1), (C2), (C3) and, if appropriate, (C4), there are no other monomers present.

Monomers (C1)

The monomers (C1) comprise at least one monoethylenically unsaturated monomer which contains at least one, preferably exactly one, nitrile group.

These monomers (C1) preferably carry no functional groups other than the nitrile group and the monoethylenically unsaturated group.

The number of nitrile groups is 1 to 2, preferably exactly 1.

Examples of monomers (C1) are acrylonitrile, methacrylonitrile, fumarodinitrile, and maleidinitrile, preferably acrylonitrile or methacrylonitrile.

With very particular preference, monomer (C1) comprises acrylonitrile.

The amount of all monomers (C1) together in accordance with the invention is 5% to 60% by weight, based on the total amount of all monomeric structural units in copolymer (C). Preferably the amount is 5% to 45% and more preferably 10% to 35% by weight.

Monomers (C2)

The monomers (C2) are monoethylenically unsaturated monomers which contain at least one acid group. The acid group may be in the form of a free acid group or else wholly or partly in salt form.

The acid groups preferably comprise at least one selected from the group of carboxyl groups, phosphoric acid groups, phosphonic acid groups, and sulfonic acid groups.

Examples of monomers with COOH groups comprise (meth)acrylic acid, vinyl acetic acid, crotonic acid or isocrotonic acid. The monomers in question may also be monomers having 2 COOH groups. Examples comprise maleic acid, fumaric acid, methylfumaric acid, methylmaleic acid, dimethylmaleic acid, and, if appropriate, the corresponding cyclic anhydrides. Preferred monomers with COOH groups are (meth)acrylic acid and also itaconic acid.

Examples of monomers which contain phosphoric and/or phosphonic acid groups comprise vinylphosphonic acid, monovinyl phosphate, allylphosphonic acid, monoallyl phosphate, 3-butenylphosphonic acid, mono-3-butenyl phosphate, mono(4-vinyloxybutyl)phosphate, phosphonoxyethyl acrylate, phosphonoxyethyl methacrylate, mono-(2-hydroxy-3-vinyloxypropyl)phosphate, mono-(1-phosphonoxymethyl-2-vinyloxyethyl)phosphate, mono(3-allyloxy-2-hydroxypropyl)phosphate, mono-2-(allylox-1-phosphonoxymethylethyl)phosphate, 2-hydroxy-4-vinyloxymethyl-1,3,2-dioxaphosphole or 2-hydroxy-4-allyloxymethyl-1,3,2-dioxaphosphole. A preferred monomer containing phosphoric and/or phosphonic acid groups is vinylphosphonic acid.

Examples of monomers containing sulfonic acid groups comprise allylsulfonic acid, methallylsulfonic acid, styrenesulfonate, vinylsulfonic acid, allyloxybenzenesulfonic acid, 2-acrylamido-2-methylpropanesulfonic acid or 2-(methacryloyl)ethylsulfonic acid. A preferred monomer containing sulfonic acid groups is acrylamido-2-methyl-propanesulfonic acid.

In the case of atmospheric corrosion control, a particularly preferred monomer (C2) used comprises monomers containing COOH and sulfonic acid groups, with very particular preference being given to itaconic acid.

The amount of all monomers (C2) together is in accordance with the invention 10% to 70% by weight, based on the total amount of all monomeric structural units in copolymer (C). Preferably the amount is 15% to 60% and more preferably 20% to 55% by weight.

Monomers (C3)

The monomers (C3) comprise at least one monoethylenically unsaturated aromatic hydrocarbon.

Examples of hydrocarbons of this kind comprise, in particular, styrene and also derivatives of styrene, such as α-methylstyrene, 2-vinyltoluene, 4-vinyltoluene or allylbenzene.

With particular preference the monomer (C3) comprises styrene.

The amount of all monomers (C3) together is in accordance with the invention 20% to 80% by weight, based on the total amount of all monomeric structural units in copolymer (C). Preferably the amount is 30% to 70% and more preferably 35% to 65% by weight.

Monomers (C4)

The copolymers (C) used in accordance with the invention may further comprise, as structural units, 0% to 25%, preferably 0% to 15%, and more preferably 0% to 10% by weight of other ethylenically unsaturated monomers (C4), which are different from but copolymerizable with (C1), (C2), and (C3). Monomers of this kind can be used—where necessary—to fine-tune the properties of the copolymer (C).

In one possible, preferred embodiment of the present invention no further monomer (C4) at all is included.

The monomers (C4) are preferably monoethylenically unsaturated monomers different than the monomers (C1) to (C3). The skilled worker will make an appropriate selection in terms of the nature and amount of such monomers (C4) in accordance with the desired properties and the desired application of the polymer.

Monomer (C4) preferably comprises a monomer containing OH groups. Such monomers may in particular be $C_1$ to $C_4$ hydroxyalkyl esters of (meth)acrylic acid, such as 2-hydroxyethyl (meth)acrylate, 2-hydroxypropyl (meth)acrylate or butane-1,4-diol monoacrylate, for example. 2-Hydroxyethyl acrylate is preferred.

With further preference the monomer in question may be a monomer containing —$NH_2$ groups, or a monomer which is able on hydrolysis to form —$NH_2$ groups. An example of one such monomer is N-vinylformamide.

OH and/or $NH_2$ groups may serve for better attachment of the copolymer (C) to the binder system, by reacting with suitable components of the binder system.

The amount of monomers (C4), where present, is generally 0.1% to 25% by weight, based on the total amount of all monomeric structural units in copolymer (C). Preferably the amount is 1% to 15%, more preferably 2% to 10%, and very preferably 3% to 7% by weight.

The monomers (C4) may also be crosslinking monomers having two or more isolated ethylenically unsaturated double bonds. Examples comprise di- and/or poly(meth)acrylates such as ethylene glycol di(meth)acrylate or butane-1,4-diol di(meth)acrylate, di-, tri- or tetraethylene glycol di(meth) acrylate or trimethylolpropane tri(meth)acrylate. However, the copolymers (C) ought not to be crosslinked too greatly. If crosslinking monomers are present, their amount ought generally not to exceed 4% by weight with respect to the sum of all of the monomers, preferably 3% by weight, and more preferably 2% by weight.

Preparation of the Copolymers (C)

The preparation of the copolymers (C) used in accordance with the invention is performed preferably by means of free-radical polymerization. The conduct of a free-radical polymerization, including required apparatus, is known in principle to the skilled worker. The polymerization is preferably carried out using thermally decomposing polymerization initiators. With preference it is possible to use peroxides as thermal initiators. The polymerization can of course also be performed photochemically.

Solvents which can be used include, preferably, monoalcohols. Examples of suitable monoalcohols comprise C1 to C8 alkoxy alcohols and, in particular, 2-butoxyethanol (butyl glycol) and 2-butoxypropanol.

Additionally preferred are alkanoic acid alkyl esters, alkanoic acid alkyl ester alcohols, alkoxylated alkanoic acid alkyl esters, and mixtures thereof.

Esters are, for example, n-butyl acetate, ethyl acetate, 1-methoxyprop-2-yl acetate, and 2-methoxyethyl acetate, and also the mono- and diacetyl esters of ethylene glycol, diethylene glycol, triethylene glycol, propylene glycol, dipropylene glycol or tripropylene glycol, such as butyl glycol acetate, for example.

Ethers are, for example, tetrahydrofuran (THF), dioxane, and also the dimethyl, diethyl or -n-butyl ethers of ethylene glycol, diethylene glycol, triethylene glycol, propylene glycol, dipropylene glycol or tripropylene glycol.

Alkanoic acid ester alcohols are, for example, poly($C_2$ to $C_3$)alkylene glycol ($C_1$ to $C_4$)monoalkyl ether acetates.

Ether alcohols are, for example, poly($C_2$ to $C_3$)alkylene glycol di($C_1$ to $C_4$)alkyl ethers, dipropylene glycol dimethyl ether, preferably butyl glycol.

Additionally conceivable are carbonates as well, such as preferably 1,2-ethylene carbonate, 1,2-propylene carbonate or 1,3-propylene carbonate.

The free-radical polymerization with thermal initiators can be performed at 50 to 200° C., preferably 60 to 180° C., more preferably at 80 to 200° C., and in particular at 100 to 170° C. The amount of initiator is 0.1% to 15% by weight based on the amount of the monomers, preferably 3% to 12% and more preferably 5% to 9% by weight. In general an amount of approximately 6% by weight is advisable. The polymerization time is typically 1 to 40 h, preferably 3 to 25 h, and more preferably 5 to 15 h. If necessary, the copolymers can be isolated from the solvent by methods known to the skilled worker.

The acidic groups of the polymer can also be wholly or, preferably, partly neutralized before, during or after the polymerization.

Examples of suitable bases for neutralizing comprise in particular linear, cyclic and/or branched $C_1$-$C_8$ mono-, di-, and trialkylamines, linear or branched $C_1$-$C_8$ mono-, di- or trialkanolamines, especially mono-, di- or trialkanolamines, linear or branched $C_1$-$C_8$ alkyl ethers of linear or branched $C_1$-$C_8$ mono-, di- or trialkanolamines, oligoamines and polyamines such as diethylenetriamine, for example.

If the neutralization is performed before or during the polymerization, the optimum amount of base is guided by the particular acidic monomer employed. The polymerization can be controlled through the degree of neutralization in such a way as to obtain the optimum residual monomer content. Neutralization is preferably performed after the polymerization.

The organic solutions of the modified copolymers that are obtained can be used directly for formulating organic crosslinkable preparations. Alternatively, of course, the polymer can also be isolated from these solutions by methods known to the skilled worker. Since the products obtained are solutions and not, as for example in JP 55-066940, hydrosols, i.e., dispersed particles, the copolymers according to the present invention are more easy to incorporate into coating materials than are dispersed particles.

For incorporation into aqueous formulations it is possible appropriately to add water to the solution and to separate off the organic solvent by means of methods known to the skilled worker.

The molecular weight $M_w$ of the copolymer is selected by the skilled worker in accordance with the desired end use. An $M_w$ which has proven appropriate is one from 3000 g/mol to 1 000 000 g/mol, preferably 4000 to 200 000 g/mol, and more preferably 5000 to 100 000 g/mol.

Method of Applying Corrosion Control Coats

By means of the method of the invention it is possible to protect in principle any metallic articles against corrosion, by treating the metallic surface with a preparation comprising at least one curable and/or crosslinkable binder system (A), a component (B) selected from the group of finely divided fillers, pigments or dyes, and a copolymer (C). The formulation may further comprise, optionally, a solvent or a solvent system (D) in which the components are in solution or dispersion. Preferably there is a solvent present.

It is possible in principle to coat all kinds of metals. Preferably, however, the substrates in question are base metals or alloys which are typically used as metallic construction materials and which require corrosion protection. Examples comprise, in particular, iron, steel, zinc, zinc alloys, aluminum or aluminum alloys.

Binder systems (A), components (B), and suitable solvents for formulating corrosion control formulations are known to the skilled worker. He or she will make an appropriate selection in accordance with the desired properties for the coat. The surface can be coated by means of customary techniques familiar to the skilled worker, preferably by spraying or brushing.

Depending on the nature of the metallic surface and/or the metallic article, there are in particular two different preferred embodiments of the method of the invention that are appropriate.

Atmospheric Corrosion Control

In the invention the method of applying corrosion control coats is a method of atmospheric corrosion control.

The metallic surfaces able to be protected by means of the method of atmospheric corrosion control may in principle be any desired surfaces. With preference, however, they are the surfaces of metallic structures or metal constructions and/or their required components. Metal constructions and structures are typically connected from construction-grade steel, such as steel girders, steel pipes or steel panels, by riveting, welding or screwing, to form corresponding constructions. The surfaces in the course of their use may be in contact with atmospheric air, although the surfaces involved may also be those which in the course of use are in contact with water, soil or other corrosive media. The metallic surfaces which are to be protected from corrosion by means of the method of the invention may in principle be any desired surfaces. Preferably, however, they are the surfaces of metallic edifices or metallic constructions and/or the components needed for them. Metallic constructions and edifices are typically joined from construction steel, such as steel girders, steel pipes or steel sheets, by riveting, welding or screwing, to form corresponding structures. In one embodiment of the invention the coated articles may be stationary metallic constructions such as, for example, buildings, bridges, power masts, tanks, containers, buildings, pipelines, power stations, chemical plants, ships, cranes, posts, bulkheads, valves, pipes, tanks, fittings, flanges, couplings, halls, roofs, and construction steel. In the case of this embodiment, corrosion control coatings are typically applied by spreading or spraying on site. This treatment may be either the original protection or else a renovation.

The surfaces in question are in particular those of iron, steel, zinc, zinc alloys, aluminum or aluminum alloys. Steel may comprise the typical alloying components known to the skilled worker.

Examples of suitable alloying constituents for Zn alloys or aluminum alloys have already been given above. Zn coatings or aluminum coatings can be applied to steel by means, for example, of hot dip methods, such as hot dip galvanizing, or by Sherardizing. Where the component is fixed or its geometry does not allow it, corresponding coats can also be applied by means of thermal spraying (spray galvanizing, spray aluminizing).

In atmospheric corrosion control, corrosion control coatings are typically applied on site by brushing or spraying. Corrosion control coatings of this kind are generally dried and cured under atmospheric conditions, in other words, for instance, at ambient temperature and in the presence of air or atmospheric oxygen and usual atmospheric humidity. Depending on the degree of control required, the control of corrosion on surfaces by means of corrosion control coatings is also termed light, medium or heavy duty corrosion control.

With particular preference the method of atmospheric corrosion control can be used for metallic surfaces which are subject to corrosion exposure of categories C2 (in accordance with DIN EN ISO 12944) or higher, preferably categories C3 or higher, and more preferably categories C4 or higher.

The corrosiveness categories in accordance with DIN EN ISO 12944 are defined by the mass loss per unit area or thickness reduction of unalloyed steel or for zinc whose surfaces have been subjected for 12 months to a defined corrosive exposure.

| C2 (low corrosivity): | unalloyed steel: | mass loss >10-200 g/m$^2$ thickness decrease >1.3-25 μm |
| --- | --- | --- |
| | zinc: | mass loss >0.7-5 g/m$^2$ thickness decrease >0.1-0.7 μm |
| C3 (medium corrosivity): | unalloyed steel: | mass loss >200-400 g/m$^2$ thickness decrease >25-50 μm |
| | zinc: | mass loss >5-15 g/m$^2$ thickness decrease >0.7-2.1 μm |
| C4 (high corrosivity): | unalloyed steel: | mass loss >400-650 g/m$^2$ thickness decrease >50-80 μm |
| | zinc: | mass loss >15-30 g/m$^2$ thickness decrease >2.1-4.2 μm |
| C5-I/M (very high): | unalloyed steel: | mass loss >650-1500 g/m$^2$ thickness decrease >80-200 μm |
| | zinc: | mass loss >30-60 g/m$^2$ thickness decrease >4.2-8.4 μm |

With particular preference the preparations of the invention are used in corrosion control materials which are employed in corrosiveness categories C2 (as per DIN EN ISO 12944) or higher, preferably in corrosiveness categories C3 or higher, and more preferably in corrosiveness categories C4 or higher.

The present method is preferably a chromium(VI)-free method, more preferably a chromium-free method. The term "chromium(VI)-free" or "chromium-free" in the context of this invention means that the preparation employed does not itself comprise any chromium(VI) compounds or, respectively, any chromium compounds at all, and that, in addition, no corrosion-inhibiting pretreatment of the metal surface with chromium(VI) compounds or chromium compounds, respectively, is carried out either. It will be appreciated that this does not rule out the possibility of traces of chromium being located—unintentionally per se—in the coat. These may, for example, be chromium traces leached from the steel during the coating of a steel containing chromium.

The method of the invention of atmospheric corrosion control is performed in accordance with the invention using a preparation which comprises at least one binder system (A) curable under atmospheric conditions, at least one component (B) selected from the group of finely divided fillers, pigments or dyes, at least one copolymer (C), and at least one solvent (D).

Binder System (A)

The binder systems (A) curable under atmospheric conditions may be the binder systems typical in the field of corrosion control coatings and other coatings. Binders or binder systems of this kind are known in principle to the skilled worker. It will be appreciated that mixtures of different binder systems can also be employed, provided that mixing does not give rise to any unwanted effects.

The term "binder system" refers below, in a way which is known in principle, to those components of the formulation that are responsible for the formation of a film.

The term "atmospheric corrosion control" in the context of this invention means that the corrosion control coating has a coat thickness after drying of at least 40 μm, preferably at least 50 μm, more preferably at least 60 μm, and very preferably at least 80 μm, and a coat thickness of up to 2 mm, preferably less than 1.5 mm, more preferably less than 1 mm, very preferably less than 800 μm and in particular less than 500 μm, with the coating material, following application to the surface under typical ambient conditions, i.e., approximately at environmental temperature or at room temperature, in the presence of air and also typical atmospheric humidity, to cure without the use of additional apparatus or equipment. Typical curing temperatures, depending on the environment, are more than 0 to 40° C., preferably 5 to 35° C., more preferably 10 to 30° C. and very preferably 15 to 25° C., in the presence of air and customary atmospheric moisture. The relative atmospheric humidity is arbitrary, and is preferably between 10% and 80% and more preferably between 30% and 70%. It is clear to the skilled worker that the time to complete curing of one and the same binder system may differ according to the ambient conditions actually prevailing.

Curing may proceed by a variety of mechanisms, depending on the nature of the binder system employed. By way of example the curing involved may be purely physical curing, produced by the evaporation of the solvent used. It may also be an oxidative curing through reaction of the binder system with the oxygen in the air. Finally, it may also be a chemical crosslinking (reactive crosslinking). Reactive binder systems comprise crosslinkable components. The crosslinkable components may be of low molecular mass, oligomeric or polymeric. The systems in question may be preferably one-component (1 K) or else two-component (2 K) systems. Reactively crosslinking systems also comprise moisture-curing binder systems, where the atmospheric moisture functions as a curing component. It will be appreciated that a binder system may also cure through a combination of different curing methods. In the case of 2 K systems the binder component and curing component are mixed, in a way which is known in principle, before the formulation is used.

The invention can be performed using water-dilutable or organically soluble binder systems. Preference is given to binder systems on an aqueous basis.

Binder systems for corrosion control coatings, especially corrosion control systems on an aqueous basis, are known in principle to the skilled worker. They may for example be epoxy resins, polyacrylates, styrene-acrylate polymers, polyesters, alkyd resins, polyurethanes of styrene-butadiene polymers.

The amount of binders (A) in the formulation is 15 to 70% by weight, based on the amount of all of the components of the formulation, including the solvent. It is set by the skilled worker in accordance with the desired properties of the coating. The amount is preferably 20% to 60% by weight and more preferably 25% to 50% by weight.

Preferred binder systems for performing the inventions are described below.

Polyacrylates or Styrene-Acrylate Copolymers (A1)

In one preferred embodiment of the invention the binder system is an aqueous or predominantly aqueous dispersion of polyacrylates or styrene-acrylate copolymers (A1).

Aqueous dispersions of polyacrylates or styrene-acrylate copolymers (A1) for preparing corrosion control coatings are known in principle to the skilled worker. The aqueous dispersions of the polyacrylates (A1) may be either primary dispersions or secondary dispersions. Suitable polyacrylates comprise as principal monomers at least one alkyl (meth)acrylate such as, for example, methyl (meth)acrylate, ethyl (meth)acrylate, butyl (meth)acrylate or 2-ethylhexyl (meth)acrylate. They can have preferably as further principal monomers vinylaromatics, especially styrene. The amount of the principal monomers together is in general at least 60% by weight, preferably at least 80% by weight. Styrene-acrylate copolymers comprise in addition to the stated alkyl (meth)acrylates as principal monomer in general at least 30% by weight, preferably at least 40% by weight, and more preferably about 50% by weight of styrene. The polyacrylates or styrene-acrylate copolymers (A1) may additionally have further comonomers as well, particularly those containing functional groups such as hydroxyl, carboxyl or carboxamide groups. Examples comprise (meth)acrylic acid, itaconic acid, maleic acid, fumaric acid, (meth)acrylamide or hydroxyalkyl (meth)acrylates. Further comonomers are preferably acidic comonomers. In addition it is also possible, optionally, for crosslinking monomers to be present as well in small amounts, typically less than 4% by weight, preferably less than 2% by weight. Examples comprise butanediol (meth)acrylate, hexanediol di(meth)acrylate or allyl acrylate.

Polyacrylates (A1) can be prepared in a way which is known in principle by means of emulsion polymerization. Further details of such polymers and of their preparation are disclosed for example in EP-A 157 133, WO 99/46337, or in "*Paints and Coatings, 2.5. Acrylic Coatings*" in Ullmann's Encyclopedia of Technical Chemistry, 6th Edition 2000, Electronic Release. The skilled worker makes an appropriate selection from the polyacrylates (A1) possible in principle, in accordance with the desired properties of the coat.

Especially suitable for performing the invention are styrene-acrylate copolymers which comprise as principal monomers at least one elastomeric acrylate such as, for example, n-butyl (meth)acrylate, n-hexyl (meth)acrylate, n-octyl acrylate or 2-ethylhexyl (meth)acrylate in a mixture with styrene and also, as secondary monomer, at least one acidic monomer, such as (meth)acrylic acid, for example. For use as binders for the formulation it is possible for some or all of the acid groups to be neutralized with suitable bases, such as, for example, ammonia.

The polyacrylates employed ought in general to have a glass transition temperature, $T_g$, in the range from 0 to 60° C., preferably in the range from 5 to 40° C. (measured by the DSC method in accordance with DIN EN ISO 11357). The glass transition temperature may be chosen by the skilled worker, in a way which is known in principle, through the selection and the proportion of hard monomers and soft monomers.

With preference for performing the invention it is possible additionally to use polyacrylates (A1) having an average particle size of 50 nm to 400 nm, more preferably 80 nm to 250 nm (measured with the Malvern® Autosizer 2 C).

Suitable acrylate dispersions and styrene-acrylate dispersions for preparing corrosion control coatings are available commercially, as for example Acronal® S 760 or Acronal® LR 8977 (BASF Aktiengesellschaft) or Acronal® Optive 410 (BASF Corporation).

Styrene-Alkadiene Polymers (A2)

In a second, preferred embodiment of the invention the binder system is an aqueous or predominantly aqueous dispersion of styrene-alkadiene polymers (A2).

Aqueous dispersions of styrene-alkadiene polymers (A2) for preparing corrosion control coatings are known in principle to the skilled worker and described for example in EP-A 47380. They may preferably be primary dispersions or else secondary dispersions.

Suitable polymers (A2) comprise as principal monomers styrene and also at least one conjugated aliphatic diene (alkadiene). The alkadienes may be, for example, butadiene, isoprene, 1,3-pentadiene or dimethylbutadiene. The styrene may also be substituted by alkyl groups. Examples comprise α-methylstyrene or 4-methylstyrene. The principal monomers are preferably styrene and butadiene. In general the polymers comprise at least 20% by weight styrene and 20% by weight alkadienes, the amount of the principal monomers together being in general at least 60% by weight, preferably at least 80% by weight. The quantities are based in each case on the sum of all of the monomers. They may additionally have further comonomers as well. Here mention may be made, on the one hand, of ethylenically unsaturated carboxylic and/or dicarboxylic acids such as (meth)acrylic acid, maleic acid or itaconic acid. Additionally the comonomers may be ethylenically unsaturated carbonitriles such as (meth)acrylonitrile and also alkyl (meth)acrylates such as methyl (meth)acrylate, n-butyl (meth)acrylate, n-hexyl (meth)acrylate, n-octyl acrylate or 2-ethylhexyl (meth)acrylate.

Styrene-alkadiene polymers (A2) can be prepared in a way which is known in principle by means of emulsion polymerization. Further details of styrene-butadiene polymers for coating materials and also of their preparation are disclosed for example in "*Paints and Coatings, 2.4.8. Polystyrene and Styrene Copolymers*" in Ullmann's Encyclopedia of Technical Chemistry, 6th Edition 2000, Electronic Release.

Particularly suitable for performing the invention are styrene-butadiene polymers which comprise as a secondary monomer one or more acidic monomers, such as, for example, (meth)acrylic acid, preferably in an amount of 0.5% to 5% by weight. For use as binders for the formulation it is possible with preference for some or all of the acid groups to be neutralized with suitable bases, such as ammonia.

The styrene-butadiene polymers (A2) employed ought in general to have a glass transition temperature $T_g$ in the range from 0 to 60° C., preferably in the range from 5 to 40° C. The glass transition temperature can be chosen by the skilled worker in a way which is known in principle through the selection and the proportion of hard monomers and soft monomers.

Preferably for performing the invention it is possible in addition to use styrene-butadiene polymers (A2) having an average particle size of 50 nm to 400 nm, more preferably 80 nm to 250 nm (measured as above).

Polyurethanes (A3)

In a third, preferred embodiment of the invention the binder system is an aqueous or predominantly aqueous dispersion of polyurethanes (A3).

Aqueous dispersions of polyurethanes (A3) for preparing corrosion control coatings are known in principle to the skilled worker. Details of polyurethanes for coating materials and also of their preparation are disclosed for example in "Paints and Coatings, 2.9 Polyurethane Coatings" in Ullmann's Encyclopedia of Technical Chemistry, 6th Edition 2000, Electronic Release. The aqueous dispersions of the polyurethanes (A3) may be either primary dispersions or secondary dispersions.

Polyurethanes for aqueous dispersions can be synthesized, in a way which is known in principle, from customary diisocyanates and also diols. With a view to effective film formation and good elasticity, diols particularly suitable for this purpose are those having a number-average molecular weight $M_n$ of about 500 to 5000 g/mol, preferably about 1000 to 3000 g/mol. For this purpose it is possible to use both polyether diols and polyester diols. The amount of such diols of relatively high molecular weight is typically 10 to 100 mol % relative to the sum of all the diols. The desired hardness and elasticity of the film can be controlled by using, in addition to the diol already mentioned, low molecular weight diols having a number-average molecular weight $M_n$ of about 60 to 500 g/mol.

For the synthesis of polyurethanes for aqueous dispersions use is made, furthermore, of monomers which comprise at least one isocyanate group or one group which is reactive toward isocyanate groups, and also, additionally, at least one hydrophilic group. These may be nonionic groups such as polyoxyethylene groups, acidic groups such as COOH, sulfonate or phosphonate groups, or basic groups such as amino groups, for example. With preference they are acidic groups. For use as binders for the formulation it is possible with preference for all or some of the acid groups to be neutralized with suitable bases. Preferred for this purpose are ammonia or amines. Further details on such polyurethane dispersions and also their preparation are described at length in WO 2005/005565, page 4 line 13 to page 14 line 14. Further examples of suitable polyurethanes are disclosed in U.S. Pat. No. 5,707,941 or in WO 2004/101638, especially page 2 line 31 to page 14 line 11.

The polyurethanes may also have been modified. By way of example, the compounds in question may be oxidatively curing urethane alkyds. For the preparation it is possible to subject, for example, triglycerides of unsaturated fatty acids to partial hydrolysis. The resultant OH group is able to react with the isocyanate groups in the course of polyurethane preparation.

With preference for performing the invention it is possible additionally to use polyurethanes (A3) having an average particle size of not more than 1000 nm, preferably less than 500, more preferably less than 200 nm, and in particular 20 to 200 nm.

Alkyd Resins (A4)

In a fourth, preferred embodiment of the invention the binder system is an aqueous or predominantly aqueous dispersion of alkyd resins (A4).

Aqueous dispersions of alkyd resins (A4) for preparing corrosion control coatings are known in principle to the skilled worker. Alkyd resins (A4) are oxidatively curing polycondensation resins of polyols and polybasic carboxylic acids, in which at least one OH group of the polyol is esterified with fatty oils and/or with natural and/or synthetic mono- or polyunsaturated fatty acids, it being necessary for at least one of the polyols employed to have a functionality of three or more.

Examples of preferred polyhydric alcohols comprise glycerol, pentaerythritol, trimethylolethane, trimethylolpropane, various diols such as ethanediol/propanediol, diethylene glycol and neopentyl glycol.

Preferred polybasic carboxylic acids are phthalic acid (anhydride) (PAn), isophthalic acid, terephthalic acid, trimellitic anhydride, adipic acid, azelaic acid, sebacic acid; phthalic acid (anhydride) is particularly preferred.

Examples of suitable oil components or fatty acids include drying oils, such as linseed oil, oiticica oil or tung oil, semi-drying oils, such as soybean oil, sunflower oil, safflower oil, ricinine oil or tall oil, nondrying oils, such as castor oil, coconut oil or peanut oil, or free fatty acids of above oils.

The molar mass $M_n$ of typical alkyd resins is between 1500 and 20 000 g/mol, preferably between 3500 and 6000 g/mol. The acid number is preferably 2 to 30 mg KOH/g, or else 35-65 mg KOH/g in the case of water-dilutable resins. The OH number is generally up to 300, preferably up to 100 mg KOH/g.

The term "alkyd resins" is also intended to comprise modified alkyd resins such as styrene-modified alkyd resins, urethane alkyds, urethane oils or epoxy resin-modified alkyd resins. Modified alkyd resins of this kind are known to the skilled worker.

Further details of alkyd resins (A4) for coating materials and also of their preparation are disclosed for example in "*Paints and Coatings, 26. Alkyd Coatings*" in Ullmann's Encyclopedia of Technical Chemistry, 6th Edition 2000, Electronic Release, and also in "*Lackformulierung and Lackrezeptur*" [Paint Formulation and Paint Formula], edited by Ulrich Zorll, p. 188 ff., Curt R. Vinzentz Verlag, Hanover, 2003.

The alkyd resins (A4) employed ought in general to have a glass transition temperature $T_g$ in the range from 0 to 60° C., preferably from 5 to 40° C.

Filler/Pigment/Dye (B)

The inventively used preparation further comprises at least one component (B) selected from the group of finely divided fillers, pigments or dyes.

The finely divided filler is generally an inorganic filler. Fillers and/or pigments may of course comprise an additional organic coating, for the purpose of hydrophobicization or hydrophilicization, for example.

The filler ought not to exceed an average particle size of 10 μm. With preference the average particle size is 10 nm to 8 μm, with particular preference 100 nm to 5 μm, and, for example, 2 to 4 μm. In the case of round or approximately round particles, this figure refers to the diameter; in the case of particles of irregular shape, such as with needle-shaped particles, for example, it refers to the longest axis. By particle size is meant the primary particle size. The skilled worker is aware of course that finely divided solids frequently undergo agglomeration into larger particles, which for use must be dispersed intensively. The particle size is chosen by the skilled worker in accordance with the desired properties of the coat.

The pigments may in particular be anticorrosion pigments. These may include both active and passive anticorrosion pigments.

Examples of active anticorrosion pigments comprise, in particular, phosphates, phosphate-containing or modified phosphates such as pigments based on zinc phosphate, zinc aluminum orthophosphate, zinc molybdenum orthophosphate, zinc aluminum molybdenum orthophosphate, calcium hydrogen phosphate, zinc calcium strontium orthophosphate silicate, zinc aluminum polyphosphate, strontium aluminum polyphosphate, zinc calcium aluminum strontium orthophosphate polyphosphate silicate and calcium aluminum polyphosphate silicate. Further examples comprise combinations of inorganic phosphates with electrochemically active organic corrosion inhibitors of low solubility, such as zinc phosphate modified with Zn salts or Ca salts of 5-nitroisophthalic acid. In addition it is also possible to use iron phosphide, zinc hydroxyphosphide, borosilicate pigments such as barium metaborate or zinc borophosphates, molybdates such as zinc molybdate, sodium zinc molybdates or calcium molybdate, pigments having ion exchange properties such as amorphous $SiO_2$ modified with calcium ions, or correspondingly modified silicates, metal oxides, such as ZnO, or else metal powders, such as zinc dust. It will be appreciated that typical organic anticorrosion pigments can also be used, such as Zn salts or Ca salts of 5-nitroisophthalic acid, for example.

Passive anticorrosion pigments prolong the diffusion pathways for corrosive components and thereby increase the corrosion resistance. Examples comprise, in particular, platelet-shaped or lamelliform pigments such as mica, hematite, phyllosilicates, linear polysilicates such as wollastonite, talc or metal flakes such as aluminum flakes or iron flakes.

Further details on anticorrosion pigments are disclosed for example in "*Pigments, 4.2 Anticorrosive Pigments*" in Ullmann's Encyclopedia of Technical Chemistry, 6th Edition 2000, Electronic Release.

The pigments may also be typical color pigment and/or effect pigment.

By effect pigments are meant all pigments which exhibit a platelet-shaped construction and impart specific decorative color effects to a surface coating. Effect pigments are known to the skilled worker. Examples comprise straight metal pigments, such as aluminum, iron or copper pigments, interference pigments, such as titanium dioxide-coated mica, iron oxide-coated mica, mixed oxide-coated mica (with titanium dioxide and $Fe_2O_3$, for example), metal oxide-coated aluminum, or liquid-crystal pigments.

Color pigments are, in particular, typical organic or inorganic absorption pigments that can be used in the paint industry. Examples of organic absorption pigments are azo pigments, phthalocyanine pigments, quinacridone pigments, and pyrrolopyrrole pigments. Examples of inorganic absorption pigments are iron oxide pigments, titanium dioxide, and carbon black.

Examples of dyes are azo, azine, anthraquinone, acridine, cyanine, oxazine, polymethine, thiazine and triarylmethane dyes. These dyes may find application as basic or cationic dyes, mordant dyes, direct dyes, disperse dyes, ingrain dyes, vat dyes, metal complex dyes, reactive dyes, acid dyes, sulfur dyes, coupling dyes or substantive dyes.

Fillers can be used to influence the properties of the coating, such as, for example, hardness, rheology or the orientation of the effect pigments. Fillers are frequently coloristically inactive; in other words, their inherent absorption is low and the refractive index is similar to that of the coating medium. Examples of fillers comprise talc, calcium carbonate, kaolin, barium sulfate, magnesium silicate, aluminum silicate, crystalline silicon dioxide, amorphous silica, aluminum oxide, microbeads or hollow microbeads made for example of glass, ceramic or polymers and having sizes of 0.1-10 μm for example. As fillers it is additionally possible to use any desired solid inert organic particles, such as urea-formaldehyde condensation products, micronized polyolefin wax or micronized amide wax. The inert fillers may each also be used in a mixture. Preferably, however, only one filler is employed in each case.

The components (B) are used in an amount of 1% to 70% by weight. The precise amount is set by the skilled worker in accordance with the desired properties of the coat. The amount is preferably 5% to 60% by weight and more preferably 10% to 50% by weight.

When using pigments and/or fillers it has been found appropriate to have pigment volume concentrations (PVCs) of 15% to 40%, preferably 20% to 40%, and more preferably 20% to 35% by volume, without any intention that the invention should be restricted thereto.

The nature and amount of components (B) are determined by the skilled worker in accordance with the end use for the coat. In one particularly preferred embodiment of the invention no chromium-containing components (B) are employed. It will be appreciated that mixtures of different components (B) can also be employed.

Preparations intended for priming are typically more highly pigmented than preparations intended for intermediate coating or top coating.

Preparations intended for priming typically comprise at least one active anticorrosion pigment; those intended for intermediate coatings, at least one passive anticorrosion pigment; and those for top coatings at least one color pigment and/or one dye.

In one particularly preferred embodiment, preparations intended for priming comprise at least one active anticorrosion pigment, at least one filler, and also, preferably, at least one color pigment.

Copolymer (C)

To produce the inventively used preparation for atmospheric corrosion control it is possible to use a single copolymer (C) or else two or more different copolymers (C). From among those copolymers (C) which are possible in principle the skilled worker will make a specific selection in accordance with the desired properties of the corrosion control coat. For the skilled worker it is obvious that not all kinds of copolymers (C) are equally suitable for all kinds of binder systems, solvents or surfaces.

For atmospheric corrosion control it is possible with preference to use copolymers (C) having COOH and/or sulfonic acid groups. Very particular preference is given to copolymers comprising itaconic acid as monomer (C2).

The inventively used copolymers (C) are employed in an amount of 0.1% to 40% by weight, preferably 0.2% to 20% by weight, and more preferably 0.5% to 10% by weight, based in each case on the amount of all of the components of the formulation.

Solvents (D)

As component (D) the preparation for atmospheric corrosion control comprises a suitable solvent. Suitable solvents are those capable of dissolving, dispersing, suspending or emulsifying the inventively used components, in order to allow uniform application of the preparation to the surface. They may be organic solvents or water. As will be appreciated, mixtures of different solvents are also possible.

Examples of organic solvents comprise hydrocarbons such as toluene, xylene and, in particular, mixtures of defined-boiling-range hydrocarbons, as obtained in the refining of crude oil, ethers such as THF or polyethers such as polyethylene glycol, ether alcohols such as butyl glycol, ether glycol acetates such as butyl glycol acetate, ketones such as acetone and alcohols such as methanol, ethanol or propanol.

The solvent is preferably water or a predominantly aqueous solvent mixture. By such are meant mixtures of the kind which comprise at least 75%, preferably at least 85%, more preferably at least 90% and very preferably at least 95% by weight of water.

Further components of predominantly aqueous solvent mixtures may be water-miscible solvents. Examples comprise, in particular, typical cosolvents such as n-butanol, butyl glycol, butyl diglycol, tert-butyl acetate, N-methyl-2-pyrrolidone, N-ethyl-2-pyrrolidone or N-cyclohexyl-2-pyrrolidone. Further components may also, however, be water-immiscible solvents. Solvents of this kind are frequently used as film-forming assistants. Examples comprise butyl glycol acetate, butyl glycol diacetate or 2,2,4-trimethyl-1,3-pentanediol 1-isobutyrate (Texanol®).

The amount of the solvent or solvent mixture (D) is 5% to 83.9% by weight with respect to the sum of all of the components of the formulation. The amount is determined by the skilled worker in accordance with the desired properties of the coating formulation. The amount is preferably 10% to 74.8% by weight, more preferably 20% to 64.5% by weight, and, for example, 30% to 50% by weight.

Further Components (E)

Beyond components (A) to (D) it is also possible for the inventively used preparation for atmospheric corrosion control to comprise one or more auxiliaries and/or additives (E). Such auxiliaries and/or additives serve to fine-tune the properties of the coat. Their amount does not, as a general rule, exceed 20% by weight with respect to the sum of all of the components bar the solvents, preferably not 10%.

Examples of suitable additives for use in atmospheric corrosion control comprise rheological assistants, UV absorbers, light stabilizers, free-radical scavengers, thermal-crosslinking catalysts, slip additives, polymerization inhibitors, defoamers, emulsifiers, devolatilizers, wetting agents, dispersants, adhesion promoters, flow control agents, film-forming auxiliaries, rheology control additives (thickeners), flame retardants, siccatives, antiskinning agents, other corrosion inhibitors, or waxes and matting agents. Additives of this kind are disclosed for example in "Lackadditive" [Additives for coatings], edited by Johan Bieleman, Wiley-VCH, Weinheim, New York, 1998, or DE-A 199 14 896, column 13 line 56 to column 15 line 54.

The preparation for implementing the method can be produced by intensively mixing all of the components of the preparation. Suitable mixing or dispersing assemblies are known to the skilled worker.

In one preferred embodiment of the invention it is possible first to prepare a dispersion from the binder system (A), the copolymer (C), and at least part of the solvent (D).

Where the binder (A) is a primary dispersion, the binder is of course in predispersed form. Where the binder is present as solid, a solution or a secondary dispersion is prepared first of all. The copolymer (C) is likewise employed preferably in dispersion, emulsion or solution in a solvent. It is advantageous for this purpose to use the solutions or emulsions of the copolymers (C) that are obtained during the preparation of the copolymers (C), without the copolymers additionally being isolated beforehand.

The components (B) and any further components (E) may subsequently be dissolved or dispersed in the initial dispersion.

Implementation of the Method of Atmospheric Corrosion Control

The corrosion control coats may be all kinds of corrosion control coatings, such as primer coatings (I), intermediate coatings (II), and top coatings (III). The corrosion control coatings in question may of course also be coatings which combine the properties of at least two of these coats, or of all three coats, and so contribute to a simplified coat system. The coating in question may also be a shop coating. The skilled person understands a shop coating to be a coat that can be applied to freshly blasted steel in order to ensure corrosion control during the manufacture of steel components—thus, for example, during the welding together of parts.

The method of the invention may serve for OEM protection or else for renovation.

As a general rule it is advisable to prepare the metallic surface for the execution of the method of the invention in a step (0), although this is not absolutely necessary in every case. By surface preparation for the execution of corrosion control measures, the skilled worker understands the cleaning of the surface to remove all contaminants and also the establishment of a surface roughness appropriate to the corrosion control measure. Examples of cleaning methods comprise cleaning with water or solvents, pickling with appropriate formulations, or high-pressure cleaning. Examples of further measures comprise abrasion and, in particular, blasting of the surface, sandblasting for example, and also flame blasting as well. In such operations it is possible for all of the adhering coats to be removed, down to the bright metal. It is, however, also possible, using less intensive methods, to remove only those coats whose adhesion is poor, while leaving intact coats on the surface. One possible technique for this purpose is that known as sweep blasting.

To implement the method at least one corrosion control coat having a thickness of at least 15 μm is applied to the metallic surface, using the preparation described which can be crosslinked under atmospheric conditions.

The corrosion control coat may be applied directly to the bright metallic surface or else to a surface which has already been precoated with a corrosion control coat.

The at least one corrosion control coat is preferably a priming coat (I), which is applied either directly to the bright metal or to a metal surface bearing a shop coating. The shop coating optionally present may likewise be obtained with the formulation of the invention or else by means of a different formulation.

Application can be carried out using the customary techniques known to the skilled worker. The preparation is preferably applied by brushing or spraying.

Following its application to the surface, the applied coating cures in step (2) of the method under atmospheric conditions. At its most simple this can be accomplished by the gradual evaporation of the solvent. Depending on the nature of the binder employed, other crosslinking processes may also run their course. Details of this have already been presented above.

Depending on the thickness of the desired corrosion control coat, the entire coat can be applied in a single operation, or else two or more coats of equal kind can be applied in succession and cured in each case, in order to achieve the desired total thickness of the corrosion control coat.

Atop the primer coat (I) it is possible for further corrosion control coats to be applied. The nature and number of the further coats are determined by the skilled worker. In particular the primer coat (I) can be provided in further operations with an intermediate coat (II) and with a top coat (III). For this purpose it is possible in principle to use arbitrary coating systems, provided that no unwanted effects arise in combination with the primer coat (I). The copolymer (C) used in accordance with the invention improves the adhesion of further coats to the primer coat. With advantage it is possible to use preparations of the invention for the primer coat (I), for the intermediate coat (II) and also for the top coat.

In a further, preferred embodiment of the method first of all an integrated primer coat (Ia) is applied which can be overcoated directly with a top coat (III). An integrated primer coat thus combines the properties of the primer coat (I) and the intermediate coat (III).

In a further, preferred embodiment of the invention only a single corrosion control coat (Ib) is applied, which requires no overcoating. Such a single corrosion control coat therefore combines the properties of all three coats.

The total thickness of corrosion control coatings of this kind is determined by the skilled worker in accordance with the desired properties of the corrosion control coat. It is generally at least 40 µm, preferably at least 50 µm, more preferably at least 60 µm, and very preferably at least 80 µm, in particular at least 100 µm, and especially at least 125 µm, often at least 150 µm, and even at least 175 µm or at least 200 µm. The upper limit on the overall coat thickness, i.e., the thickness of all applied corrosion control coats together, is 2 mm, preferably less than 1.5 mm, more preferably less than 1 mm, very preferably less than 800 µm, and in particular less than 500 µm.

The examples which follow are intended to illustrate the invention.

Part I: Preparation of the Polymeric Corrosion Inhibitors

Polymer 1

Copolymer of 35 mol % acrylonitrile, 15 mol % itaconic acid, and 50 mol % styrene.

In a 2 l pilot-scale stirrer unit with anchor stirrer and internal thermometer 77 g of itaconic acid in 314.8 g of tetrahydrofuran were gassed with nitrogen and heated to 65° C. Over the course of 5 h a feed stream 1 of 74.2 g of acrylonitrile and 207.9 g of styrene and, over the course of 6 h, a feed stream 2 of 21.6 g of 2,2'-azobis(2,4-dimethylvaleronitrile) (trade name WAKO® V-65) in 120 g of tetrahydrofuran were added. The reaction mixture was stirred at 65° C. for a further 2 h. Thereafter, over the course of 1 h, 3.6 g of WAKO V-65 in 36 g of tetrahydrofuran were added and the mixture was stirred for a further 4 h. The resulting Polymer 1 is a clear, yellow solution having a solids content of 48.5% and a K value of 20.9.

Polymer 1a

Polymer 1a (with solids content of 23.8%) was obtained by mixing 30 g of Polymer 1, 22.5 g of butyl glycol, 15 g of water, and 2.0 g of dimethylethanolamine.

Polymer 1b

Polymer 1b (with solids content of 30.4%) was obtained by mixing 30 g of Polymer 1, 15 g of butyl glycol, 12 g of water and 4.0 g dimethylethanolamine.

Polymer 2

Copolymer of 50 mol % acrylonitrile, 20 mol % itaconic acid, and 30 mol % styrene.

In a 2 l pilot-scale stirrer unit with anchor stirrer and internal thermometer 111.8 g of itaconic acid in 314.8 g of tetrahydrofuran were gassed with nitrogen and heated to 65° C. Over the course of 5 h a feed stream 1 of 114 g of acrylonitrile and 134.2 g of styrene and, over the course of 6 h, a feed stream 2 of 21.6 g of WAKO V-65 in 120 g of tetrahydrofuran were added. The reaction mixture was stirred at 65° C. for a further 2 h. Thereafter, over the course of 1 h, 3.6 g of WAKO V-65 in 36 g of tetrahydrofuran were added and the mixture was stirred for a further 4 h. The resulting Polymer 2 was diluted with 250 g of tetrahydrofuran to give a clear, yellow solution having a solids content of 50.7% and a K value of 20.4.

Polymer 2a

Polymer 2a (with solids content of 26.8%) was obtained by mixing 30 g of Polymer 2, 15 g of butyl glycol, 20 g of water, and 3.0 g of dimethylethanolamine.

Polymer 2b

Polymer 2b (with solids content of 29.9%) was obtained by mixing 30 g of Polymer 2, 15 g of butyl glycol, 20 g of water and 6.0 g dimethylethanolamine.

Polymer 3

Copolymer of 20 mol % acrylonitrile, 40 mol % itaconic acid, and 40 mol % styrene.

In a 2 l pilot-scale stirrer unit with anchor stirrer and internal thermometer 179.6 g of itaconic acid in 314.8 g of tetrahydrofuran were gassed with nitrogen and heated to 65° C. Over the course of 5 h a feed stream 1 of 36.6 g of acrylonitrile and 143.8 g of styrene and, over the course of 6 h, a feed stream 2 of 21.6 g of WAKO V-65 in 120 g of tetrahydrofuran were added. The reaction mixture was stirred at 65° C. for a further 2 h. Thereafter, over the course of 1 h, 3.6 g of WAKO V-65 in 36 g of tetrahydrofuran were added and the mixture was stirred for a further 4 h. The resulting Polymer 3 was diluted with 250 g of tetrahydrofuran to give a clear, yellow solution having a solids content of 49.5% and a K value of 18.7.

Polymer 3a (with solids content of 30.2%) was obtained by mixing 30 g of Polymer 3, 15 g of butyl glycol, 15 g of water, and 4.7 g of dimethylethanolamine.

Polymer 4

Copolymer of 20 mol % acrylonitrile, 40 mol % itaconic acid, and 40 mol % styrene In a 2 l pilot-scale stirrer unit with anchor stirrer and internal thermometer 280.2 g of itaconic acid in 380.8 g of 2-butyloxyethanol were gassed with nitrogen and heated to 90° C. Over the course of 5 h a feed stream 1 of 57.1 g of acrylonitrile and 224.3 g of styrene and, over the course of 6 h, a feed stream 2 of 33.7 g of tert-butyl peroctoate in 303.4 g of 2-butyloxyethanol were added. The reaction mixture was stirred at 90° C. for a further hour. Thereafter, the temperature of the reaction mixture was raised to 95° C. and, over the course of 1 h, 5.6 g of sodium peroxodisulfate in 77.5 g of DI water (fully demineralized water) were added and the mixture was stirred for a further 1 h at 95° C. The step was repeated three times more with analogous conditions. The resulting polymer gives a dark yellow, cloudy solution with a solids content of 38.3%.

Polymer 4a

Polymer 4a (with solids content of 30.0%) was obtained by mixing 75 g of Polymer 4, 41.6 g of DI water, and 8.9 g of dimethylethanolamine.

Polymer 4b

Polymer 4b (with solids content of 30.0%) was obtained by mixing 75 g of Polymer 4, 55.6 g of DI water, and 14.9 g of triethanolamine.

Polymer 4c

Polymer 4c (with solids content of 30.0%) was obtained by mixing 75 g of Polymer 4, 17.1 g of DI water, and 14.0 g of 25% strength ammonia solution.

Polymer 5

Copolymer of 21.1 mol % acrylonitrile, 36.9 mol % itaconic acid, and 42.0 mol % styrene In a 2 l pilot-scale stirrer unit with anchor stirrer and internal thermometer 246.4 g of itaconic acid in 380.8 g of 2-butyloxyethanol were gassed with nitrogen and heated to 90° C. Over the course of 5 h a feed stream 1 of 57.1 g of acrylonitrile and 224.3 g of styrene and, over the course of 6 h, a feed stream 2 of 33.7 g of tert-butyl peroctoate in 303.4 g of 2-butyloxyethanol were added. The reaction mixture was stirred at 90° C. for a further hour. Thereafter, the temperature of the reaction mixture was raised to 95° C. and, over the course of 1 h, 5.6 g of sodium peroxodisulfate in 77.5 g of DI water were added and the mixture was stirred for a further 1 h at 95° C. The step was repeated three times more with analogous conditions. The resulting polymer gives a dark yellow, cloudy solution with a solids content of 37.0%.

Polymer 5a

Polymer 5a (with solids content of 30.0%) was obtained by mixing 68.4 g of Polymer 5, 33.0 g of DI water, and 7.3 g of dimethylethanolamine.

Polymer 5b

Polymer 5b (with solids content of 30.0%) was obtained by mixing 70.0 g of Polymer 5, 39.6 g of DI water, 1.5 g of itaconic acid, and 8.5 g of dimethylethanolamine.

Polymer 6

In a 2 l pilot-scale stirrer unit with anchor stirrer and internal thermometer 246.4 g of itaconic acid in 380.8 g of propylene glycol monobutyl ether were gassed with nitrogen and heated to 90° C. Over the course of 5 h a feed stream 1 of 57.1 g of acrylonitrile and 224.3 g of styrene and, over the course of 6 h, a feed stream 2 of 33.7 g of tert-butyl peroctoate in 303.4 g of propylene glycol monobutyl ether were added. The reaction mixture was stirred at 90° C. for a further hour. Thereafter, the temperature of the reaction mixture was raised to 95° C. and, over the course of 1 h, 5.6 g of tert-butyl peroctoate in 50.4 g of propylene glycol monobutyl ether were added and the mixture was stirred for a further 1 h at 95° C. The step was repeated three times more with analogous conditions. The resulting polymer gives a dark yellow, clear solution with a solids content of 39.7%.

Polymer 6a

Polymer 6a (with solids content of 30.0%) was obtained by mixing 63.7 g of Polymer 6, 37.7 g of DI water, and 7.3 g of dimethylethanolamine.

Polymer 6b

Polymer 6b (with solids content of 30.0%) was obtained by mixing 65.2 g of Polymer 6, 44.4 g of DI water, 1.5 g of itaconic acid, and 8.5 g of dimethylethanolamine.

Polymer 7

In a 2 l pilot-scale stirrer unit with anchor stirrer and internal thermometer, 215.5 g of itaconic acid in 292.8 g of n-butanol, admixed with 147.7 g of dimethylethanolamine, were gassed with nitrogen and heated to 90° C. Over the course of 5 h a feed stream 1 of 43.9 g of acrylonitrile and 172.6 g of styrene and, over the course of 6 h, a feed stream 2 of 25.9 g of tert-butyl peroctoate in 233.4 g of n-butanol were added. The reaction mixture was stirred at 90° C. for a further hour. Thereafter, over the course of 1 h, 4.3 g of tert-butyl peroctoate in 59.6 g of n-butanol were added and the mixture was stirred at 95° C. for one further h. The step was repeated two times more with analogous conditions, with stirring for 2 h following the final addition. The temperature in the heating bath was increased to 120° C.

Following addition of 250 g of DI water, n-butanol was distilled off azeotropically by introduction of steam. The resulting polymer gives a dark yellow, clear solution having a solids content of 34.7%.

Polymer 8

In a 2 l pilot-scale stirrer unit with anchor stirrer and internal thermometer, 179.6 g of itaconic acid in 209.9 g of n-butanol, and 104.9 g of DI water, were gassed with nitrogen and heated to 90° C. Over the course of 5 h a feed stream 1 of 36.6 g of acrylonitrile and 143.8 g of styrene and, over the course of 6 h, a feed stream 2 of 21.6 g of tert-butyl peroctoate in 194.4 g of n-butanol were added. The reaction mixture was stirred at 90° C. for a further hour. Thereafter, over the course of 1 h, 3.6 g of tert-butyl peroctoate in 32.4 g of n-butanol were added and the mixture was stirred at 95° C. for one further h. The step was repeated two times more with analogous conditions, with stirring for 2 h following the final addition. The temperature in the heating bath was increased to 105° C.

Following addition of 123.1 g of dimethylethanolamine in 500 g of DI water over the course of 30 minutes, n-butanol was distilled off azeotropically by introduction of steam. The resulting polymer gives a yellow, virtually clear solution having a solids content of 33.5%.

Polymer 9

In a 2 l pilot-scale stirrer unit with anchor stirrer and internal thermometer, 229.0 g of itaconic acid in 311.1 g of tetrahydrofuran, were gassed with nitrogen and heated to 65° C. Over the course of 5 h a feed stream 1 of 46.7 g of acrylonitrile and 183.3 g of styrene and, over the course of 6 h, a feed stream 2 of 27.5 g of Wako V 65 in 247.9 g of tetrahydrofuran were added. The reaction mixture was stirred at 65° C. for a further hour. Thereafter, over the course of 1 h, 4.6 g of Wako V 65 in 41.3 g of tetrahydrofuran were added and the mixture was stirred at 70° C. for 2 further hours. The temperature in the heating bath was increased to 95° C. 270 g of tetrahydrofuran were removed by distillation. The temperature in the heating bath was raised to 100° C. and 200 g of DI water were metered in over the course of 1 hour, in the course of which 170 g of tetrahydrofuran/DI water were removed by distillation.

Following addition of 157.1 g of dimethylethanolamine in 600 g of DI water over the course of 60 minutes, tetrahydrofuran was distilled off azeotropically by introduction of steam. The resulting polymer gives a yellow, virtually clear solution having a solids content of 31.2%.

Part II: Performance Tests

For performance testing, three different corrosion control formulations based on two commercial aqueous styrene-acrylate dispersions for paints (Acronal® Optive 410, BASF Corp., and Acronal® S 790, BASF AG), and also a laboratory sample of a dispersion based on n-butyl acrylate and styrene as principal monomers, which was prepared in the same way as in EP 1062282, were used. The dispersions employed have the following properties:

|  | Acronal® Optive 410 | Acronal® S 790 | Laboratory sample |
|---|---|---|---|
| Solids content | 49-51% | 49-51% | about 50-51% |
| pH | 7.5-8.5 | 7.5-9.0 | about 9.5 |
| Viscosity | 500-1000 cps (Brookfield) | 700-1500 mPas (at 100 s−1) | about 200 mPas (at 100 s−1) |
| Density | 1.06 g/cm3 | 1.08 g/cm3 | not determined |
| MFFT (Minimum Film-Forming-Temperature (to ASTM D 2354 or ISO 2115)) | about 12° C. | about 20° C. | not determined |
| Particle size | about 110 nm | about 135 nm | about 125 nm |

The formulations of the invention were produced by adding 3% by weight of each of the copolymers to the respective styrene-acrylate dispersion (calculated as solid copolymer relative to the solids fraction of the dispersion). This was done using the above-described copolymer solutions containing butyl glycol.

For comparison purposes a sample without addition of a polymeric corrosion inhibitor was produced in the case of each of the coating materials based on Acronal® Optive 410 or Acronal® S 790; for the test series based on the laboratory specimen, an alternative polymeric inhibitor was added for comparison purposes.

Guideline Formulation for Corrosion Control Primers

Using the resultant aqueous dispersions of styrene-acrylate copolymers with and without addition of corrosion control polymers, preparations were produced in accordance with the following instructions:

Coating Material Based on Acronal® Optive 410:

393.4 g of the respective aqueous polymer dispersion were admixed with 2.2 g of a commercial defoamer for coating materials (mixture of polysiloxanes and hydrophobic solids in polyglycol; BYK® 022, Byk), after which a mixture consisting of 0.6 g of an anionic dispersant (acidic phosphoric ester of a fatty alcohol alkoxylate; Lutensit® A-EP, BASF AG), 11.0 g of concentrated ammonia and 58.6 g of water was added by means of a Dispermat. Incorporated additionally, with stirring, was a mixture of 7.2 g of phenoxypropanol (film-forming assistant) and 7.2 g of benzine (boiling range 180-210° C., film-forming assistant).

Added subsequently were 85.0 g of a hematite pigment (Bayferrox® 130 M, Lanxess), 82.1 g of an anticorrosion pigment based on zinc phosphate (Heucophos® ZPZ, modified zinc phosphate, Heubach), 36.0 g of magnesium silicate (filler; talc 20 M 2, Luzenac), and 127.8 g of a filler based on barium sulfate and zinc sulfide (30% by weight ZnS) (Litopone® L, Sachtleben). The whole mixture was dispersed with glass beads (ø3 mm) for at least 30 minutes. Thereafter, with further stirring, a further 166.4 g of polymer dispersion, 1.9 g of BYK® 022, and 3.7 g of a 1:1 mixture of water and a commercial corrosion inhibitor (corrosion inhibitor L 1, Erbslöh) were added and the glass beads were removed by sieving.

To finish, the batch was admixed with a mixture of 3.7 g of a 25% strength solution of a commercial, urethane-based thickener (Collacral® PU 85, BASF AG) and 13.2 g of butyl glycol (solvent) and also, if appropriate, the pH was adjusted to approximately 9.5 using concentrated ammonia. This gave 1000 g of a corrosion control primer with a solids content of 61% and a pigment/volume concentration (PVC) of 23%.

Coating Material Based on Acronal® S 790:

530.6 g of the respective aqueous polymer dispersion were admixed with 2.8 g of a commercial defoamer for coating materials (combination of liquid hydrocarbons, hydrophobic silica, fatty substances, oxalkylated compounds, and nonionic emulsifiers; Agitan® 295, Münzing-Chemie), after which a mixture consisting of 0.9 g of an anionic dispersant (sodium salt of a medium-molecular polyacrylic acid, 35% strength in water; Pigmentverteiler NL, BASF AG), 20.8 g of concentrated ammonia and 115.7 g of water was added by means of a Dispermat. Incorporated additionally, with stirring, was a mixture of 9.2 g of phenoxypropanol (film-forming assistant) and 9.2 g of benzine (boiling range 180-210° C., film-forming assistant).

Added subsequently were 74.7 g of a hematite pigment (Bayferrox® 130 M, Lanxess), 74.7 g of an anticorrosion pigment based on zinc phosphate (Heucophos® ZPZ, modified zinc phosphate, Heubach), 37.1 g of calcium carbonate (filler; Millicarb, Omya), and 112.2 g of a filler based on barium sulfate and zinc sulfide (30% by weight ZnS) (Litopone® L, Sachtleben). The whole mixture was dispersed with glass beads (ø3 mm) for at least 30 minutes.

Thereafter, with further stirring, 1.9 g of Agitan® 295, 3.5 g of a 1:1 mixture of water and a commercial corrosion inhibitor (corrosion inhibitor L 1, Erbslöh) and 1.9 g of an in-can preservative based on chloromethyl- and methyl-isothiazolone+N-/O-formals (Parmetol A 26, Schülke & Mayr) were added and the glass beads were removed by sieving.

To finish, the batch was admixed with a mixture of 2.2 g of a 25% strength solution of a commercial, urethane-based thickener (Collacral® PU 75, BASF AG) and 2.6 g of butyl glycol (solvent) and also, if appropriate, the pH was adjusted to approximately 9.5 using concentrated ammonia. This gave 1000 g of a corrosion control primer with a solids content of 57% and a pigment/volume concentration (PVC) of 23%.

Coating Material Based on the Laboratory Sample 250 g of the respective aqueous polymer dispersion (approximately 50% strength) were admixed with 1.14 g of a commercial defoamer for coating materials (mixture of polysiloxanes and hydrophobic solids in polyglycol; BYK® 022, Byk) and also with 2.22 g of a wetting agent (Surfynol® 104, 50% strength in n-propanol; Air Products), after which a mixture consisting of 0.6 g of an anionic dispersant (acidic phosphoric ester of a fatty alcohol alkoxylate; Lutensit® A-EP, BASF AG), 1.56 g of concentrated ammonia and 41.6 g of water was added by means of a Dispermat. Incorporated additionally, with stirring, was a mixture of film-forming assistants composed of 4.5 g of phenoxypropanol, 4.5 g of butyl glycol and 4.5 g of benzine (boiling range 180-210° C.).

Added subsequently were 68.0 g of a hematite pigment (Bayferrox® 130 M, Lanxess), 65.9 g of an anticorrosion pigment based on zinc phosphate (Heucophos® ZPZ, modified zinc phosphate, Heubach), 28.3 g of magnesium silicate (filler; talc 20 M 2, Luzenac), and 102.2 g of a filler based on barium sulfate and zinc sulfide (30% by weight ZnS) (Litopone® L, Sachtleben). The whole mixture was dispersed with glass beads (ø3 mm) for at least 30 minutes.

Thereafter, with further stirring, a further 1.14 g of BYK® 022, and 3.24 g of a 1:1 mixture of water and a commercial corrosion inhibitor (corrosion inhibitor L 1, Erbslöh) were added and the glass beads were removed by sieving.

To finish, the batch was admixed with a mixture of 2.2 g of a 25% strength solution of a commercial, urethane-based thickener (Collacral® PU 85, BASF AG) and 2.2 g of butyl glycol (solvent) and also, if appropriate, the pH was adjusted to approximately 9.5 using concentrated ammonia. This gave about 600 g of a corrosion control primer with a solids content of about 66% and a pigment/volume concentration (PVC) of 35%.

Application of the Formulations to Steel Panels, Preparation for the Salt Spray Test The primers under test were diluted with fully demineralized water to the desired viscosity of 300 to 1000 mPas (measured with a 455N/65 Digital Rotothinner® from Sheen Instruments) and drawn down using a box-section doctor blade onto a cleaned, non-galvanized steel panel (200×80× 0.9 mm); the slot size is selected so as to give a dry film thickness of 60-85 μm.

After six days of drying at room temperature and one day of thermal conditioning at 50° C., the reverse side of the test panel was coated with a solvent-based coating material, for protection from corrosion, and the edges were masked off with Tesa® film tape.

To end with, the metal test panel was inscribed down to the substrate, using a scorer, on the side coated with the primer under test.

Salt Spray Test/Evaluation

Using the samples, a salt spray test was conducted in accordance with DIN EN ISO 7253; for the coating materials based on Acronal Optive® 410 and Acronal® S 790 the duration of the test was 400 h, for the coating materials based on the laboratory sample it was 576 h.

Evaluation took place here by visual comparison of tested samples with the prescribed standards of ISO 7253.

For the evaluation of the corrosion behavior:

Spreading of the Blisters at the Scribe Mark

Minimum and maximum distance in mm of the blisters caused by corrosion, starting from the artificial damage site, in accordance with ISO 4628-2.

Delamination at the Scribe Mark

In contrast to the cross-cut (see below), the adhesion of the coating is investigated in the direct vicinity of the artificial damage site. For this purpose, immediately after the salt spray test, the coating has an adhesive tape applied to it, over the scribe mark, the coating material is incised at the edges of the adhesive tape, and then the adhesive tape is pulled off ("Tesa® tear-off"). Measurements are made of the minimum and maximum distances in mm of the metal substrate laid bare as a result of the tearing, starting from the artificial damage site.

Rust Undermining at the Scribe Mark

Starting from the artificial damage site, rust forms beneath the coating. The value indicates the minimum and maximum distance in mm of the iron oxide formed, measured from the scribe mark; prior to inspection, the metallic substrate was exposed in the usual way by means of the abovementioned "Tesae tear-off".

Surface Corrosion

Proportion of the surface area corroded in relation to the total surface area of the metal test panel, in [%]

Cross-Cut (in Accordance with DIN EN ISO 2409)

The cross-cut test is used to determine the adhesion of the coating to the substrate. For this purpose a lattice comprising a number of cuts (at a linear distance of 2 mm) is incised into the coating after the salt spray test, the lattice is overstuck with adhesive tape, and then the adhesive tape is removed. An evaluation was made of the appearance of the lattice after the adhesive tape has been removed. Scores of 0 to 5 are awarded, in accordance with the following scale:

GT 0 The cut edges are completely smooth and none of the squares of the lattice has undergone delamination.

GT 1 The coating has undergone a delamination along the cut edges, but the delaminated area is not substantially greater than 15% of the cross-cut area.

GT 2 The delaminated lattice area is significantly greater than 15% but not substantially greater than 35%.

GT 3 The coating has undergone partial or full delamination in broad strips along the cut edges, or some squares have undergone partial or complete delamination.

GT 4 The cross-cut area affected, however, is not substantially greater than 65%.

GT 5 Any delamination that can be classified as more severe than GT 4.

The results of the tests are compiled in table 1 (coating materials based on Acronal® Optive 410) and table 2 (coating materials based on Acronal® S 790). Photographs of the sample surface of the blank sample and of coating materials with polymer 3 are collected in FIG. 1 (coating materials based on Acronal® Optive 410) and FIG. 2 (coating materials based on Acronal® S 790).

The data in tables 1 and 2 and also the figures show that the corrosion is significantly inhibited by the copolymers (polymers 1a, 1b, 2a, 2b and 3) used in accordance with the invention, in comparison to a sample without polymeric corrosion inhibitors. Whereas, in the case of the coating materials based on Acronal® Optive 410, in the context of the comparison sample without corrosion inhibitor, there is pronounced blistering at the scribe mark, accompanied by loss of adhesion and rust undermining, this tendency is absent or significantly reduced in the case of the inventive examples. The same applies to the coating materials based on Acronal® S 790, for which the comparison sample without corrosion inhibitor is corroded over the entire area, whereas the surface corrosion when the copolymers of the invention are added was reduced significantly to up to 10-20%.

TABLE 1

Compilation for the results in the salt spray test for the coatings based on Acronal ® Optive 410

|  | Blank sample | Polymer 1a | Polymer 1b | Polymer 2a | Polymer 2b | Polymer 3 |
| --- | --- | --- | --- | --- | --- | --- |
| Polymeric corrosion inhibitor | none | AN/IA/S (35/15/50) | AN/IA/S (35/15/50) | AN/IA/S (50/20/30) | AN/IA/S (50/20/30) | AN/IA/S (20/40/40) |
| Film thickness [µm] | 67-82 | 66-82 | 66-75 | 66-81 | 68-81 | 67-88 |
| Blisters at scribe mark [mm] | 7.7-edge | 0-edge | 0-edge | 0-18.3 | 0-11.3 | 0-6.0 |
| Delamination at the scribe mark [mm] | 5.0-9.0 and blisters | 2.0-9.0 and blisters | 1.6-10.6 and blisters | 1.0-9.8 | 0.5-4.0 | 0 |
| Rust undermining at the scribe mark [mm] | 1.6-4.9 | 0-1.0 | 0-0.5 | 0-3.2 | 1.0-2.8 | 0 |

AN: acrylonitrile,
IA: itaconic acid,
S: styrene

TABLE 2

Compilation of the results in the salt spray test for coatings based on Acronal ® S 790

|  | Blank sample | Polymer 1a | Polymer 1b | Polymer 2a | Polymer 2b | Polymer 3 |
| --- | --- | --- | --- | --- | --- | --- |
| Polymeric corrosion inhibitor | none | AN/IA/S (35/15/50) | AN/IA/S (35/15/50) | AN/IA/S (50/20/30) | AN/IA/S (50/20/30) | AN/IA/S (20/40/40) |

TABLE 2-continued

Compilation of the results in the salt spray test for coatings based on Acronal ® S 790

|  | Blank sample | Polymer 1a | Polymer 1b | Polymer 2a | Polymer 2b | Polymer 3 |
|---|---|---|---|---|---|---|
| Film thickness [μm] | 68-78 | 64-77 | 72-85 | 64-71 | 65-74 | 68-76 |
| Surface corrosion | 100% | about 20% | about 20% | about 10% | about 80% | about 10% |
| Cross-cut after salt spray test | Gt 5 | Gt 0 | Gt 0 | Gt 0 | Gt 5 | Gt 0 |

AN: acrylonitrile,
IA: itaconic acid,
S: styrene

TABLE 3

Compilation of the results in the salt spray test for the coatings based on the laboratory sample

|  | Comparative | Polymer 3 | Polymer 4a | Polymer 4b | Polymer 4c | Polymer 5a | Polymer 5b | Polymer 7 |
|---|---|---|---|---|---|---|---|---|
| Film thickness [μm] | 65-79 | 66-81 | 65-78 | 71-88 | 69-81 | 69-88 | 66-78 | 69-80 |
| Rust undermining at the scribe mark [mm] | 2-25 and blisters | 1-7 and blisters | 5-25 | 2-25 | 1-25 | 9-24 | 2-19 | 2-13 |
| Surface corrosion | 55% | 13% | 30% | 27% | 22% | 50% | 15% | 27% |

AN: acrylonitrile,
IA: itaconic acid,
S: styrene

The invention claimed is:

1. A method comprising applying a corrosion control coat to a metallic surface, the method comprising treating the metallic surface with a preparation comprising a binder system (A), a component (B) selected from the group consisting of a finely divided filler, a pigment and a dye, and a polymeric corrosion preventative, wherein said polymeric corrosion preventative is a copolymer (C) obtained by polymerizing monomeric building blocks:
  (C1) 5% to 60% by weight of at least one monoethylenically unsaturated monomer which comprises at least one nitrile group,
  (C2) 10% to 70% by weight of at least one monoethylenically unsaturated monomer which comprises at least one acid group,
  (C3) 20% to 80% by weight of at least one monoethylenically unsaturated aromatic hydrocarbon, and
  (C4) optionally 0% to 25% by weight of at least one non-ethylenically unsaturated monomer,
  the amount being based in each case on the total amount of all monomeric structural units in the copolymer; and
  drying and curing the polymeric corrosion preventative under atmospheric conditions.

2. The method according to claim 1, wherein the monomer (C1) comprises acrylonitrile.

3. The method according to claim 1, wherein the monomer (C3) comprises styrene.

4. The method according to claim 1, wherein the monomer (C2) comprises itaconic acid.

5. The method according to claim 1, wherein the acid groups are wholly or partly neutralized.

6. The method according to claim 1, wherein the amount of monomer (C1) is 5% to 45%, the amount of monomer (C2) is 15% to 60%, and the amount of monomer (C3) is 30% to 70% by weight.

7. The method according to claim 1, wherein copolymer (C) is obtained by polymerizing (C1), (C2), (C3) and (C4), wherein (C4) is present in an amount of 0.1% to 25% by weight.

8. The method according to claim 7, wherein copolymer (C) is obtained by polymerizing (C1), (C2), (C3) and (C4), wherein (C4) comprises a monoethylenically unsaturated monomer comprising an OH group.

9. The method according to claim 1, wherein said metallic surface is a surface of steel, zinc, zinc alloy, aluminum or aluminum alloy.

10. The method according to claim 1, comprising applying a corrosion control coat having a thickness of at least 15 μm, wherein the method comprises:
  (1) applying a preparation which is curable under an atmospheric condition to a bright or precoated metallic surface, said preparation comprising:
  (A) 15% to 70% by weight of at least one binder system curable under the atmospheric condition,
  (B) 1% to 70% by weight of at least one component selected from the group consisting of a finely divided filler, a pigment and a dye,
  (C) 0.1% to 40% by weight of the copolymer, and
  (D) 5% to 83.9% by weight of at least one solvent,
  the amount being based in each case on the total amount of all of the components of the preparation, and
  (2) curing the applied layer under the atmospheric condition.

11. The method according to claim 10, wherein the acid group of monomer (C2) is at least one of a carboxyl group and a sulfonic acid group.

12. The method according to claim 11, wherein the monomer (C2) comprises itaconic acid.

13. The method according to claim 10, wherein the binder system is an aqueous or predominantly aqueous dispersion of at least one of polyacrylate and styrene-acrylate copolymer (A1), a styrene-alkadiene polymer (A2), a polyurethane (A3) and a alkyd resin (A4).

14. The method according to claim 10, wherein the surface is a surface of a metallic structure or a metal construction.

15. The method according to claim 14, wherein the surface is a surface of a building, a bridge, a power mast, a tank, a container, a building, a pipeline, a power station, a chemical plant, a ship, a crane, a post, a bulkhead; a valve, a pipe, a tank, a fitting, a flange, a coupling, a hall, a roof, or a construction steel.

16. The method according to claim 10, wherein the thickness of the cured coat is at least 25 μm.

17. A preparation for applying a corrosion control coat to a metallic surface for atmospheric corrosion control, comprising:
- (A) 15% to 70% by weight of at least one binder system curable under an atmospheric condition,
- (B) 1% to 70% by weight of at least one component selected from the group consisting of a finely divided filler, a pigment and a dye,
- (C) 0.1% to 40% by weight of a copolymer (C) obtained by polymerizing monomeric building blocks:
  - (C1) 5% to 60% by weight of at least one monoethylenically unsaturated monomer which comprises at least one nitrile group,
  - (C2) 10% to 70% by weight of at least one monoethylenically unsaturated monomer which comprises at least one acid group,
  - (C3) 20% to 80% by weight of at least one monoethylenically unsaturated aromatic hydrocarbon, and
  - (C4) optionally 0% to 25% by weight of at least one non-ethylenically unsaturated monomer, and
- (D) 5% to 83.9% by weight of at least one solvent, the amount being based in each case on the total amount of all of the components of the formulation.

\* \* \* \* \*